United States Patent
Yang (10) Patent No.: US 12,004,016 B2
(45) Date of Patent: Jun. 4, 2024

(54) METHOD AND APPARATUS FOR TRANSMITTING CONFIGURATION INFORMATION

(71) Applicant: BEIJING XIAOMI MOBILE SOFTWARE CO., LTD., Beijing (CN)

(72) Inventor: Xing Yang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 400 days.

(21) Appl. No.: 17/312,859

(22) PCT Filed: Dec. 14, 2018

(86) PCT No.: PCT/CN2018/121285
§ 371 (c)(1),
(2) Date: Jun. 10, 2021

(87) PCT Pub. No.: WO2020/118706
PCT Pub. Date: Jun. 18, 2020

(65) Prior Publication Data
US 2022/0014974 A1    Jan. 13, 2022

(51) Int. Cl.
*H04W 36/00* (2009.01)
*H04W 72/20* (2023.01)

(52) U.S. Cl.
CPC ... *H04W 36/0009* (2018.08); *H04W 36/0072* (2013.01); *H04W 36/00835* (2018.08); *H04W 72/20* (2023.01)

(58) Field of Classification Search
CPC ......... H04W 36/0009; H04W 36/0072; H04W 36/00835; H04W 72/20; H04W 72/23; H04W 36/03; H04W 72/51; H04W 36/32
See application file for complete search history.

(56) References Cited

U.S. PATENT DOCUMENTS

| | | | |
|---|---|---|---|
| 10,129,902 B2 | 11/2018 | Kaur et al. | |
| 2015/0271860 A1* | 9/2015 | Baghel | H04W 76/14 455/552.1 |

(Continued)

FOREIGN PATENT DOCUMENTS

| | | |
|---|---|---|
| CN | 104410975 A | 3/2015 |
| CN | 105657643 A | 6/2016 |

(Continued)

OTHER PUBLICATIONS

International Search Report of PCT Application No. PCT/CN2018/121285 dated Aug. 29, 2019 with English translation (4p).

(Continued)

*Primary Examiner* — Mazda Sabouri
(74) *Attorney, Agent, or Firm* — Arch & Lake LLP (57) ABSTRACT

The present invention relates to a method and apparatus for transmitting configuration information. The method comprises: when a cell change is performed, checking whether scheduled user equipment is moved out of a pre-configured area range; and when the scheduled user equipment is moved out of the pre-configured area range, sending a notification message to scheduling user equipment in a group, the notification message comprising related information that is related to sending resource pool information of the changed cell.

13 Claims, 7 Drawing Sheets

(56) References Cited

U.S. PATENT DOCUMENTS

| | | | |
|---|---|---|---|
| 2015/0312788 A1* | 10/2015 | Delsol | H04W 24/10 |
| | | | 370/252 |
| 2017/0142741 A1 | 5/2017 | Kaur et al. | |
| 2017/0245248 A1 | 8/2017 | Lei et al. | |
| 2018/0279188 A1* | 9/2018 | Tenny | H04W 36/0055 |
| 2018/0279267 A1 | 9/2018 | Yasukawa et al. | |
| 2018/0376525 A1 | 12/2018 | Feng | |
| 2019/0059094 A1 | 2/2019 | Kaur et al. | |
| 2019/0166646 A1* | 5/2019 | Shih | H04W 72/04 |
| 2021/0258853 A1* | 8/2021 | Wang | H04W 28/0268 |
| 2021/0274390 A1* | 9/2021 | Kifle | H04W 36/0009 |
| 2021/0360504 A1* | 11/2021 | Zhang | H04W 36/32 |

FOREIGN PATENT DOCUMENTS

| | | |
|---|---|---|
| CN | 106341771 A | 1/2017 |
| CN | 107295562 A | 10/2017 |
| CN | 108029072 A | 5/2018 |
| EP | 3089534 A1 | 11/2016 |
| WO | 2015188345 A1 | 12/2015 |
| WO | 2017128275 A1 | 8/2017 |

OTHER PUBLICATIONS

English translation of the Written Opinion of the International Search Authority in the international application No. PCT/CN2018/121285, mailed on Aug. 28, 2019, (3p).
First Office Action of the Chinese Application No. 201880002861.X, issued on Sep. 2, 2020 with English translation, (18p).
Second Office Action of the Chinese Application No. 201880002861.X, issued on Mar. 11, 2021 with English translation, (18p).

* cited by examiner

METHOD AND APPARATUS FOR TRANSMITTING CONFIGURATION INFORMATION

CROSS-REFERENCE TO RELATED APPLICATION

This is a national phase application of International Application No. PCT/CN2018/121285, filed on Dec. 14, 2018, the entire contents of which are hereby incorporated by reference in its entirety.

TECHNICAL FIELD

The present disclosure relates to the field of communication technology, and more particularly to a method and device for transmitting configuration information.

BACKGROUND

Sometimes, communication between user equipments (UEs) may be performed through a sidelink, and communication between vehicle-mounted devices in the Vehicle to everything (V2X) may adopt the sidelink. Based on the service requirement, multiple UEs may form a group, and a scheduling UE in the group may allocate transmission resources for other scheduled UEs in the group. However, the scheduling UE and the scheduled UE in the same group may be located in different cells, and the scheduling UE cannot know configuration information of a cell where the scheduled UE is located, and therefore cannot allocate the transmission resources for the scheduled UE.

SUMMARY

The embodiments of the disclosure provide a method and device for transmitting configuration information. The technical solutions are as follows.

According to a first aspect of the embodiments of the present disclosure, a method for transmitting configuration information is provided, which includes the following operations.

It is checked whether a scheduled user equipment (UE) has moved out of a preconfigured area range when a cell change is performed.

A notification message is sent to a scheduling UE in a same group when the scheduled UE has moved out of the preconfigured area range, and the notification message includes relevant information regarding transmission resource pool information of a changed cell.

The technical solutions provided by the embodiments of the present disclosure may have the following beneficial effects. In the present embodiment, the scheduled UE checks whether the scheduled UE has moved out of the preconfigured area range during the movement, and actively sends the transmission resource pool information of a new cell to the scheduling UE when the scheduled UE has moved out of the preconfigured area range. In this way, it is ensured that the scheduling UE acquires the transmission resource pool information of the new cell in time, so as to configure the transmission resource pool information of the new cell for the scheduled UE.

In one embodiment, before the operation that it is checked whether the scheduled UE has moved out of the preconfigured area range, the method further includes the following operation.

Area range information from the scheduling UE in the same group is received.

The technical solutions provided by the embodiments of the present disclosure may have the following beneficial effects. The area range in the present embodiment may be configured to the scheduled UE by the scheduling UE.

In one embodiment, the area range information includes one of cell list information, system information area identifier list information and radio access network (RAN) area identifier list information.

The technical solutions provided by the embodiments of the present disclosure may have the following beneficial effects. The present embodiment provides multiple area ranges, which are applicable to multiple application scenarios.

In one embodiment, the area range is a cell before the change.

The technical solutions provided by the embodiments of the present disclosure may have the following beneficial effects. The preconfigured area range in the present embodiment may also be a single cell, and the configuration is relatively simple.

In one embodiment, the notification message includes radio resource control (RRC) signaling between UEs or medium access control (MAC) signaling between UEs.

The technical solution provided by the embodiments of the present disclosure may have the following beneficial effects. In the present embodiment, the notification message may be sent through multiple signaling, which is applicable to multiple application scenarios.

In one embodiment, the relevant information regarding the transmission resource pool information of the changed cell includes at least one of:

a cell identifier of the changed cell, available transmission resource pool information of the changed cell, system information area identifier information corresponding to the changed cell, RAN area identifier information corresponding to the changed cell or no network coverage information after the change.

The technical solution provided by the embodiment of the present disclosure may have the following beneficial effects. The present embodiment provides multiple pieces of related information, which is applicable to multiple application scenarios.

In one embodiment, before the operation that the notification message is sent to the scheduling UE in the same group, the method further includes the following operation.

System information sent by a base station is received when the base station serves on a frequency used for communication between the UEs. The system information includes the cell identifier and the available transmission resource pool information of the changed cell.

The technical solution provided by the embodiments of the present disclosure may have the following beneficial effects. In the present embodiment, the scheduled UE may acquire the transmission resource pool information of the cell from the base station in the changed cell.

In one embodiment, the system information further includes the system information area identifier information and the RAN area identifier information.

The notification message further includes the system information area identifier information and the RAN area identifier information.

The technical solution provided by the embodiment of the present disclosure may have the following beneficial effects. The system information area identifier list information and the RAN area identifier list information may also be acquired in the present embodiment to facilitate the scheduling UE to update an original list.

According to a second aspect of the embodiments of the present disclosure, a method for transmitting configuration information is provided, which includes the following operations.

Area range information is acquired from a base station.

The area range information is sent to a scheduled UE in a same group.

In one embodiment, the method further includes the following operation.

Relevant information regarding transmission resource pool information of a cell outside the area range is received from the scheduled UE in the same group.

In one embodiment, the relevant information regarding the transmission resource pool information of the cell outside the area range includes at least one of:

a cell identifier of the cell, available transmission resource pool information of the cell, system information area identifier information corresponding to the cell, radio access network (RAN) area identifier information corresponding to the cell or no network coverage information.

According to a third aspect of the embodiments of the present disclosure, a device for transmitting configuration information is provided, which includes a checking circuit and a sending circuit.

The checking circuit is configured to check whether a scheduled UE has moved out of a preconfigured area range when a cell change is performed.

The sending circuit is configured to send a notification message to a scheduling UE in a same group when the scheduled UE has moved out of the preconfigured area range, and the notification message includes relevant information regarding transmission resource pool information of a changed cell.

In one embodiment, the device further includes a first receiving circuit.

The first receiving circuit is configured to receive area range information from the scheduling UE in the same group.

In one embodiment, the area range information includes one of cell list information, system information area identifier list information and radio access network (RAN) area identifier list information.

In one embodiment, the area range is a cell before the change.

In one embodiment, the notification message includes radio resource control (RRC) signaling between UEs or medium access control (MAC) signaling between UEs.

In one embodiment, the relevant information regarding the transmission resource pool information of the changed cell includes at least one of:

a cell identifier of the changed cell, available transmission resource pool information of the changed cell, system information area identifier information corresponding to the changed cell, radio access network (RAN) area identifier information corresponding to the changed cell or no network coverage information after the change.

In one embodiment, the device further includes a second receiving circuit.

The second receiving circuit is configured to receive system information sent by a base station when the base station serves on a frequency used for communication between the UEs, and the system information includes the cell identifier and the available transmission resource pool information of the changed cell.

In one embodiment, the system information further includes the system information area identifier information and the radio access network (RAN) area identifier information.

The notification message further includes the system information area identifier information and radio access network (RAN) area identifier information.

According to a fourth aspect of the embodiments of the present disclosure, a device for transmitting configuration information is provided, which includes an acquiring circuit and a sending circuit.

The acquiring circuit is configured to acquire area range information from a base station.

The sending circuit is configured to send the area range information to a scheduled UE in a same group.

In one embodiment, the device further includes a receiving circuit.

The receiving circuit is configured to receive relevant information regarding transmission resource pool information of a cell outside the area range from the scheduled UE in the same group.

In one embodiment, the relevant information regarding the transmission resource pool information of the cell outside the area range includes at least one of:

a cell identifier of the cell, available transmission resource pool information of the cell, system information area identifier information corresponding to the cell, radio access network (RAN) area identifier information corresponding to the cell or no network coverage information.

According to a fifth aspect of the embodiments of the present disclosure, a device for transmitting configuration information is provided, which includes:

a processor; and a memory for storing instructions executable by the processor.

The processor is configured to:

check whether a scheduled UE has moved out of a preconfigured area range when a cell change is performed; and send a notification message to a scheduling UE in a same group when the scheduled UE has moved out of the preconfigured area range, and the notification message includes relevant information regarding transmission resource pool information of a changed cell.

According to a sixth aspect of the embodiments of the present disclosure, a device for transmitting configuration information is provided, which includes:

a processor; and a memory for storing instructions executable by the processor.

The processor is configured to:

acquire area range information from a base station; and send the area range information to a scheduled UE in a same group.

According to a seventh aspect of the embodiments of the present disclosure, a computer-readable storage medium having stored thereon computer instructions is provided. The computer instructions, when executed by a processor, implement the method on a scheduled UE side described above.

According to an eighth aspect of the embodiments of the present disclosure, a computer-readable storage medium having stored thereon computer instructions is provided. The computer instructions, when executed by a processor, implement the method on a scheduling UE side described above.

It is to be understood that the foregoing general description and the following detailed description are only exemplary and explanatory and are not intended to limit the present disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Exemplary embodiments will be described in detail herein, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses consistent with some aspects of the disclosure.

Sometimes, a directly-connected network operates on uplink time-frequency resource of a mobile cellular. In order to avoid interference between the directly-connected network and uplink transmission of the mobile cellular network, the mobile cellular network allocates a transmission resource pool for sending information and a receiving resource pool for receiving information to the directly-connected network.

Multiple user equipments (UEs) may form a group based on the needs of service or the like. There may be a UE responsible for scheduling in the group, which is referred to as a scheduling UE, and the scheduling UE may allocate transmission resource to other UEs in the same group within the known range of the transmission resource pool of the directly-connected network. Other UEs in the same group are referred to as scheduled UEs. When the scheduling UE and the scheduled UE are located in the same cell, the scheduling UE may know the transmission resource pool of a cell where the scheduled UE is located, and may allocate the transmission resource to the scheduled UE within the range of the transmission resource pool. If the scheduling UE and the scheduled UE are not in the same cell, the scheduling UE cannot know the transmission resource pool of a cell where the scheduled UE is located, and thus cannot allocate the transmission resource for the scheduled UE.

In order to solve the above problem, in the present embodiment, when a cell change is performed on the scheduled UE, the scheduled UE actively send relevant information regarding the transmission resource pool information of the changed cell to the scheduling UE. In this way, the scheduling UE may know the transmission resource pool of a current serving cell where the scheduled UE after the change is located, and then may allocate the transmission resource to the scheduled UE.

Figure 1:
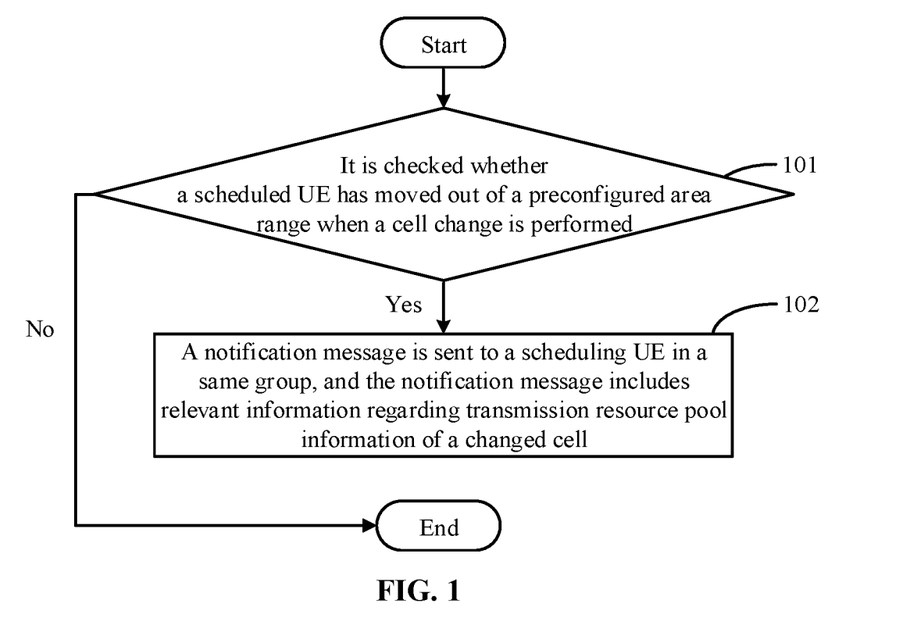
FIG. 1 is a flowchart of a method for transmitting configuration information according to an exemplary embodiment.

FIG. 1 is a flowchart of a method for transmitting configuration information according to an exemplary embodiment, which is applied to a UE. The UE may be a mobile phone, a computer, a digital broadcast terminal, a messaging device, a game console, a tablet equipment, a medical equipment, a fitness equipment, a personal digital assistant and the like. As shown in FIG. 1, the method includes the following operations 101-102.

In 101, it is checked whether a scheduled UE has moved out of a preconfigured area range when a cell change is performed.

In 102, a notification message is sent to a scheduling UE in a same group when the scheduled UE has moved out of the preconfigured area range, and the notification message includes relevant information regarding transmission resource pool information of a changed cell.

In the present embodiment, the scheduled UE may be in an active state, an inactive state or an idle state during the movement. The procedures of the cell change in different states are different, so the cell change includes a cell reselection or a cell handover.

In the present embodiment, the area range is preconfigured, and the scheduling UE knows configuration of the transmission resource pool within the area range. When the scheduled UE moves out of the area range, it is necessary to send the transmission resource pool information of a new cell to the scheduling UE. The scheduling UE updates a local area range according to the received transmission resource pool information of the new cell, and may also allocate the transmission resource to the scheduled UE based on the transmission resource pool information.

In the present embodiment, when the scheduled UE does not move out of the preconfigured area range, the process may be terminated without sending the notification message.

In one embodiment, before the operation that it is checked whether the scheduled UE has moved out of the preconfigured area range, the method further includes an operation A.

In the operation A, area range information from the scheduling UE in the same group is received.

In the present embodiment, the scheduling UE may periodically send the area range information to all the scheduled UEs in the same group. Alternatively, when a new UE joins the group as a scheduled UE, the scheduling UE sends the area range information to the scheduled UE. Alternatively, when the area range is updated, the area range information is sent to all the scheduled UEs in the same group. There may also be other transmission strategies, all of which are applicable to the present embodiment.

The scheduled UE may acquire the area range information through information transmission with the scheduling UE, and determine whether the scheduled UE has moved out of the area range during the movement.

In one embodiment, the area range information includes one of cell list information, system information area identifier list information and radio access network (RAN) area identifier list information.

In the present embodiment, the area range may have multiple granularities. For example, take the cell as a granularity. One or more cells form the area range. The scheduling UE stores the cell list information of these cells. The cell list information at least includes cell identifiers and corresponding transmission resource pool information. The scheduled UE checks whether the cell identifier of a new changed cell is in the cell list. If not, it is determined that the scheduled UE moves out of the area range.

For another example, take the system information area as a granularity. One or more cells having the same cell configuration information form the system information area. Since each cell in the system information area has the same cell configuration information, the received system information is the same. Therefore, an area formed by one or more cells having the same cell configuration information is referred to as the system information area in the present embodiment. The system information area identifier is configured for the system information area. The scheduling UE stores the system information area identifier list information of these system information areas. The system information area identifier list information at least includes a system information area identifier and the corresponding transmission resource pool information. The scheduled UE checks whether the system information area identifier corresponding to the new cell after the change is in the system information area identifier list information. If not, it is determined that the scheduled UE has moved out of the area range.

For another example, takes the RAN area as a granularity. In the inactive state, the UE may transform to be in the connected state when the uplink data arrives. The cell reselection is performed in the RAN area and it is unnecessary to inform the base station of a result of the cell reselection, because the base station may perform page on the UE in the RAN area when the downlink data arrives. When the UE moves out of the RAN area, it is necessary to inform the base station of the result of the cell reselection, and the base station may update the RAN area accordingly. The base station in the RAN area is able to perform resource coordination, and therefore the applicable range of the transmission resource pool allocated for the UE may be the same as the RAN area. When the scheduled UE moves out of the current RAN area, it is necessary to allocate the transmission resource for the scheduled UE. Therefore, the scheduling UE needs to know the transmission resource pool information of a new RAN area after the scheduled UE moves out. The RAN area is generally formed by multiple cells, and the transmission resource pool information of the RAN area is also formed by transmission resource pool information of the multiple cells. The scheduled UE checks whether the RAN area identifier corresponding to the new cell after the change is in the RAN area identifier list information. If not, it is determined that the scheduled UE has moved out of the area range.

The cell list information, the system information area identifier list information and the RAN area identifier list information stored by the scheduled UE may be sent to the scheduled UE by the scheduling UE in advance. The cell list information, the system information area identifier list information and the RAN area identifier list information stored by the scheduling UE may be sent to the scheduling UE by the base station in advance, that is, the base station configures the cell list information, the system information area identifier list information and the RAN area identifier list information. The scheduling UE may also update the cell list information, the system information area identifier list information and the RAN area identifier list information through report of the scheduled UE.

In one embodiment, the area range is a cell before the change.

In the present embodiment, a cell may also be taken as the preconfigured area range, and thus the scheduled UE moves out when the cell change is performed. In this way, the operation A may not need to be performed. The checking process is also relatively simple.

The area range may be configured by the directly-connected network system for all UEs (including a scheduling UE and scheduled UEs) as a cell. When the scheduled UE moves out of a cell where the scheduled UE is located previous, it may be determined that the scheduled UE has moved out of the preconfigured area.

In one embodiment, the notification message includes RRC signaling between UEs or MAC signaling between UEs.

In the present embodiment, communication between the scheduling UE and the scheduled UE may have various manners, such as the RRC signaling between the UEs or the MAC signaling between the UEs, which may be used for the notification message. It is convenient for the scheduled UE to send the transmission resource pool information of the new cell to the scheduling UE in time.

In one embodiment, the relevant information regarding the transmission resource pool information of the changed cell includes at least one of:

a cell identifier of the changed cell, available transmission resource pool information of the changed cell, system information area identifier information corresponding to the changed cell, RAN area identifier information corresponding to the changed cell or no network coverage information after the change.

The scheduled UE may send the cell identifier only to the scheduling UE. The changed cell of the scheduled UE may be very close to a cell where the scheduling UE is located. When the scheduling UE receives the cell identifier of the changed cell, the scheduling UE may receive the system information in the changed cell and then acquire the available transmission resource pool information of the changed cell.

The scheduled UE may send the cell identifier of the changed cell and the available transmission resource pool information of the changed cell to the scheduling UE. In this way, the scheduling UE may directly acquire the available transmission resource pool information of the changed cell through the notification message without receiving the system information in the changed cell. The available transmission resource pool information includes transmission resource pool information configured by the base station for the UE in a normal state and transmission resource pool information configured by the base station for the UE in an abnormal state. The scheduled UE sends the corresponding available transmission resource pool information according to its own current state.

The scheduled UE may send the system information area identifier information corresponding to the changed cell and the available transmission resource pool information of the changed cell to the scheduling UE. Since the available transmission resource pool information in the system information area is the same, the available transmission resource pool information of the changed cell is applicable to a system information area corresponding to the changed cell.

The scheduled UE may send the RAN area identifier information corresponding to the changed cell and the available transmission resource pool information of the changed cell to the scheduling UE. The available transmission resource pool information of the changed cell may be applicable to a RAN area corresponding to the changed cell.

The scheduled UE may send the no network coverage information after the change to the scheduling UE. The available transmission resource pool information includes available transmission resource pool information configured by a base station when the base station serves on a frequency used for communication between the UEs, and also includes available transmission resource pool information fixedly configured by the directly-connected network when no base station serves on the frequency used for communication between the UEs. The scheduling UE knows the available transmission resource pool information fixedly configured by the directly-connected network in advance, and the available transmission resource pool information is applicable to all areas. Therefore, when the scheduled UE informs the scheduling UE that there is no network coverage for the changed cell, the scheduling UE automatically adopts the available transmission resource pool information fixedly configured by the directly-connected network.

In one embodiment, before the notification message is sent to the scheduling UE in the same group, the method further includes an operation B.

In the operation B, system information is received from a base station when the base station serves on a frequency used for communication between the UEs, and the system information includes the cell identifier and the available transmission resource pool information of the changed cell.

In the present embodiment, after the scheduled UE is changed to a new cell, when the base station serves on the frequency used for communication between the UEs in the new cell, the system information is received from the base station. The system information may be included in the system information block 1 (SIB1). The cell identifier and the available transmission resource pool information may be acquired through the SIB1.

In the present embodiment, the frequency for the communication between the UEs refers to the frequency used for the communication between the UEs in the directly-connected network, which is applicable to communication between the scheduling UE and the scheduled UE, and is also applicable to communication between the scheduled UEs, as well as being applicable to communication between the scheduling UEs.

In one embodiment, the system information further includes the system information area identifier information and the RAN area identifier information.

The notification message further includes the system information area identifier information and the RAN area identifier information.

In the embodiment, after the scheduled UE is changed to a new cell, the system information area identifier information and the RAN area identifier information corresponding to the new cell may also be acquired through the SIB1 in the new cell.

The scheduling UE may update, according to the received notification message, system information area identifier list information and RAN area identifier list information stored locally.

The implementation procedure is described in detail by way of embodiments.

Figure 2:
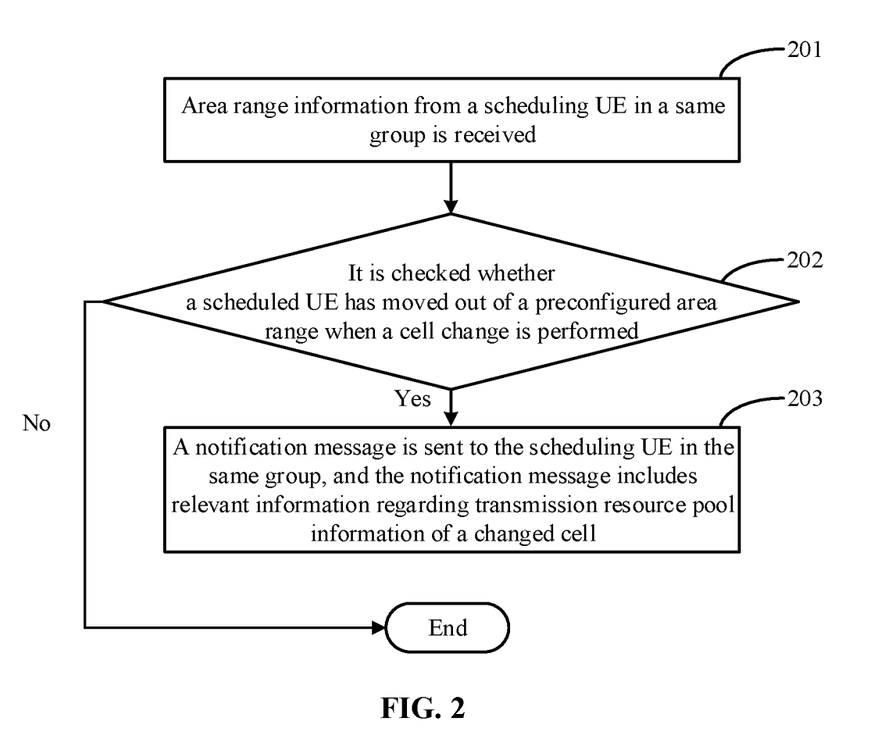
FIG. 2 is a flowchart of a method for transmitting configuration information according to an exemplary embodiment.

FIG. 2 is a flowchart of a method for transmitting configuration information according to an exemplary embodiment, which is applied to a UE. The UE may be a mobile phone, a computer, a digital broadcast terminal, a messaging device, a game console, a tablet equipment, a medical equipment, a fitness equipment, a personal digital assistant and the like. As shown in FIG. 2, the method includes the following operations 201-203.

In 201, area range information from a scheduling UE in a same group is received.

In 202, it is checked whether a scheduled UE has moved out of a preconfigured area range when a cell change is performed.

In 203, a notification message is sent to the scheduling UE in the same group when the scheduled UE has moved out of the preconfigured area range, and the notification message includes relevant information regarding transmission resource pool information of a changed cell.

Figure 3:
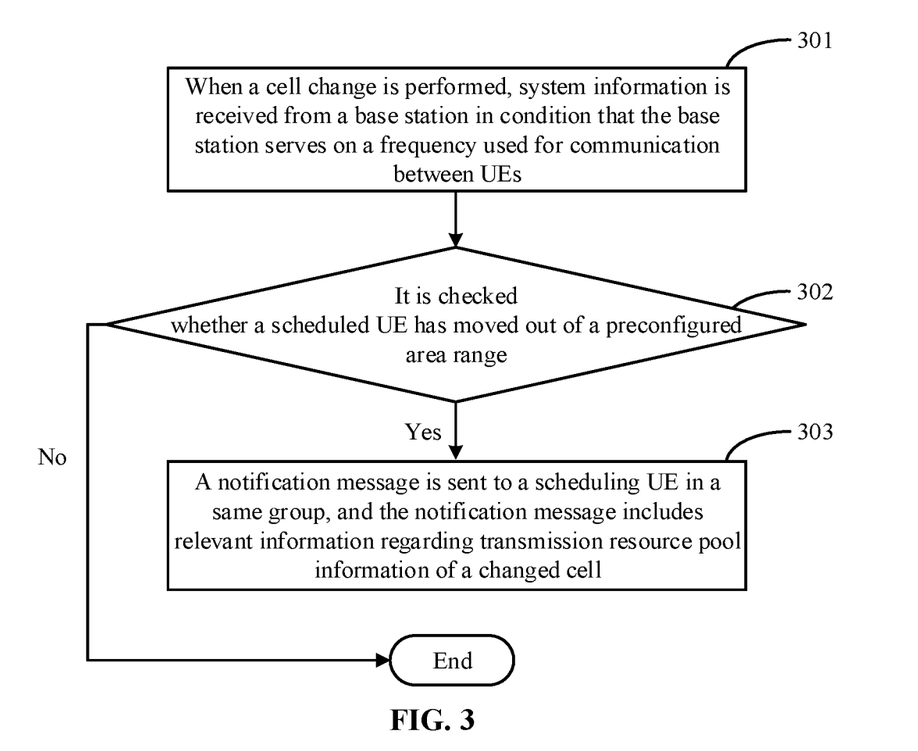
FIG. 3 is a flowchart of a method for transmitting configuration information according to an exemplary embodiment.

FIG. 3 is a flowchart of a method for transmitting configuration information according to an exemplary embodiment, which is applied to a UE. The UE may be a mobile phone, a computer, a digital broadcast terminal, a messaging device, a game console, a tablet equipment, a medical equipment, a fitness equipment, a personal digital assistant and the like. As shown in FIG. 3, the method includes the following operations 301-303.

In 301, when a cell change is performed, system information is received from a base station in condition that the base station serves on a frequency used for communication between UEs. The system information includes a cell identifier and available transmission resource pool information of a changed cell.

In 302, it is checked whether a scheduled UE has moved out of a preconfigured area range.

The operation 301 and operation 302 are two relatively independent processes without strict sequence of execution.

In the operation 303, a notification message is sent to a scheduling UE in a same group when the scheduled UE has moved out of the preconfigured area range, and the notification message includes relevant information regarding transmission resource pool information of the changed cell.

The implementation procedure on the scheduled UE side is described above. The scheduling UE side has also been improved. The following describes the implementation procedure on the scheduling UE side.

Figure 4:
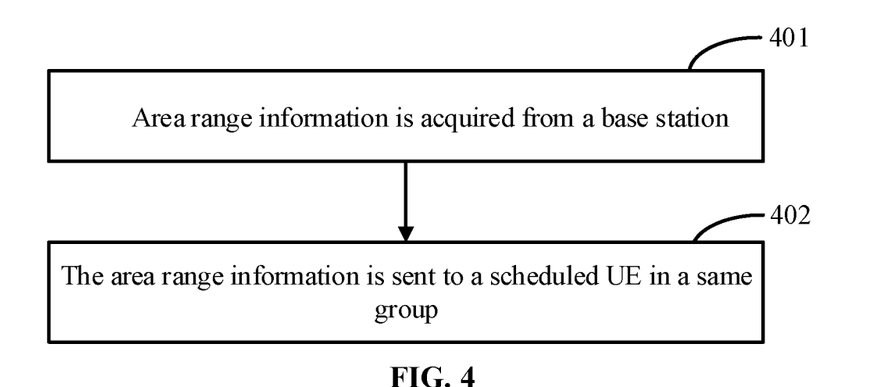
FIG. 4 is a flowchart of a method for transmitting configuration information according to an exemplary embodiment.

FIG. 4 is a flowchart of a method for transmitting configuration information according to an exemplary embodiment, which is applied to a UE. The UE may be a mobile phone, a computer, a digital broadcast terminal, a messaging device, a game console, a tablet equipment, a medical equipment, a fitness equipment, a personal digital assistant and the like. As shown in FIG. 4, the method includes the following operations 401-402.

In 401, area range information is acquired from a base station.

In 402, the area range information is sent to a scheduled UE in a same group.

In the present embodiment, when a scheduling UE accesses to a cell, the scheduling UE may establish a connection with a base station in condition that the base station serves on a frequency used for communication between UEs, receive system information from the base station and acquire the area range information. The area range information is then sent to the scheduled UE in the same group.

In one embodiment, the method further includes an operation C.

In the operation C, relevant information regarding transmission resource pool information of a cell outside the area range is received from the scheduled UE in the same group.

In the present embodiment, the scheduling UE may also receive the notification message sent by the scheduled UE, and acquire the transmission resource pool information of the cell outside the area range via the notification message.

In one embodiment, the relevant information regarding the transmission resource pool information of the cell outside the area range includes at least one of:

a cell identifier of the cell, available transmission resource pool information of the cell, system information area identifier information corresponding to the cell, RAN area identifier information corresponding to the cell or no network coverage information.

Figure 5:
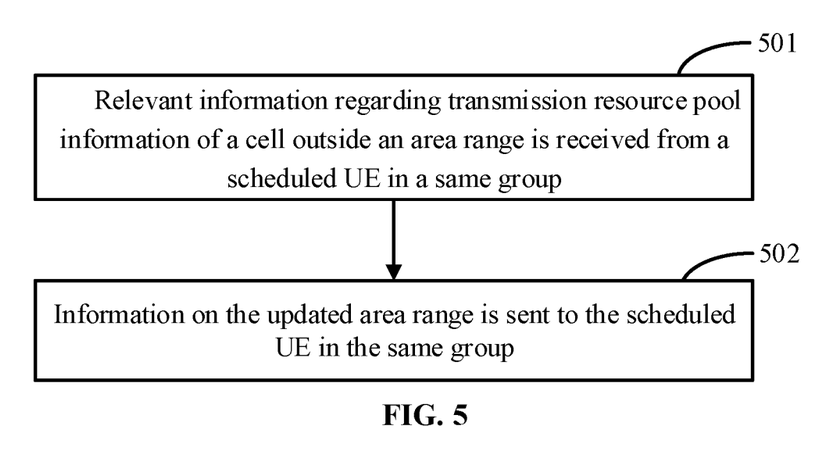
FIG. 5 is a flowchart of a method for transmitting configuration information according to an exemplary embodiment.

FIG. 5 is a flowchart of a method for transmitting configuration information according to an exemplary embodiment, which is applied to a UE. The UE may be a mobile phone, a computer, a digital broadcast terminal, a messaging device, a game console, a tablet equipment, a medical equipment, a fitness equipment, a personal digital assistant and the like. As shown in FIG. 5, the method includes the following operations 501-502.

In 501, relevant information regarding transmission resource pool information of a cell outside an area range is received from a scheduled UE in a same group.

In 502, information on the updated area range is sent to the scheduled UE in the same group.

The above various embodiments may be combined freely according to actual needs.

The following is the device embodiments of the present disclosure, which may be used to execute the method embodiments of the present disclosure.

Figure 6:
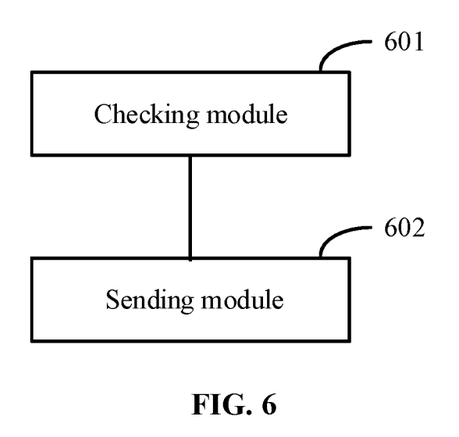
FIG. 6 is a block diagram of a device for transmitting configuration information according to an exemplary embodiment.

FIG. 6 is a block diagram of a device for transmitting configuration information according to an exemplary embodiment, which may be implemented as part or all of an electronic device through software, hardware, or a combination of software and hardware. Referring to FIG. 6, the device for transmitting configuration information includes a checking module 601 and a sending module 602.

The checking module 601 is configured to check whether a scheduled UE has moved out of a preconfigured area range when a cell change is performed.

The sending module 602 is configured to send a notification message to a scheduling UE in a same group when the scheduled UE has moved out of the preconfigured area range. The notification message includes relevant information regarding transmission resource pool information of a changed cell.

Figure 7:
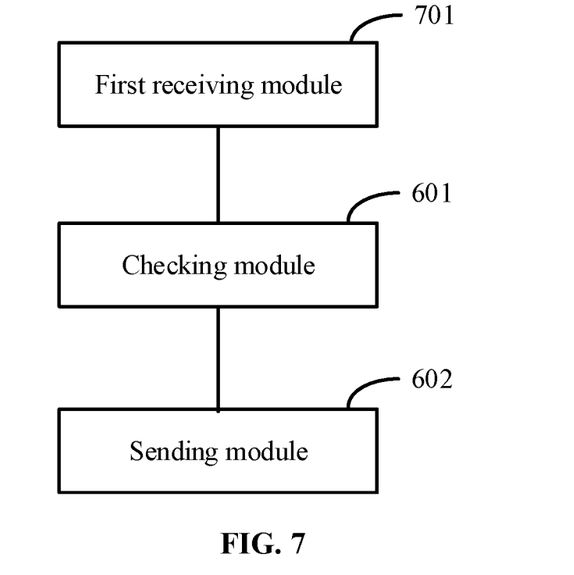
FIG. 7 is a block diagram of a device for transmitting configuration information according to an exemplary embodiment.

In one embodiment, as shown in FIG. 7, the device further includes a first receiving module 701.

The first receiving module 701 is configured to receive area range information from the scheduling UE in the same group.

In one embodiment, the area range information includes one of cell list information, system information area identifier list information and RAN area identifier list information.

In one embodiment, the area range is a cell before the change.

In one embodiment, the notification message includes RRC signaling between UEs or MAC signaling between UEs.

In one embodiment, the relevant information regarding the transmission resource pool information of the changed cell includes at least one of:

a cell identifier of the changed cell, available transmission resource pool information of the changed cell, system information area identifier information corresponding to the changed cell, RAN area identifier information corresponding to the changed cell or no network coverage information after the change.

Figure 8:
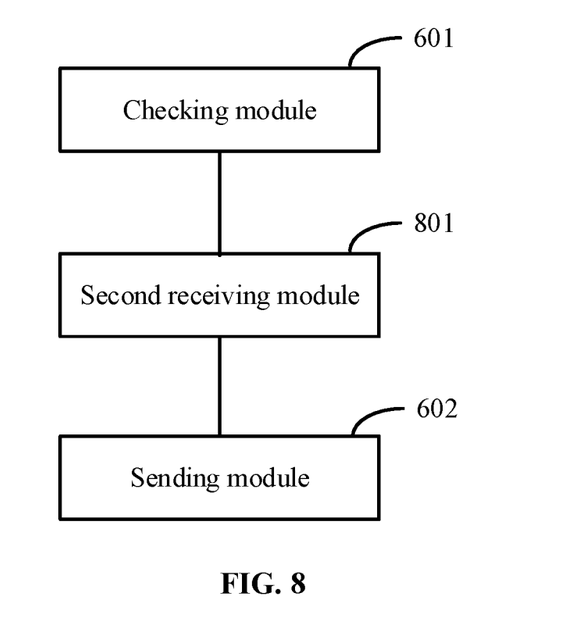
FIG. 8 is a block diagram of a device for transmitting configuration information according to an exemplary embodiment.

In one embodiment, as shown in FIG. 8, the device further includes a second receiving module 801.

The second receiving module 801 is configured to receive system information from a base station when the base station serves on a frequency used for communication between the UEs, and the system information includes the cell identifier and the available transmission resource pool information of the changed cell.

In one embodiment, the system information further includes the system information area identifier information and the RAN area identifier information.

The notification message further includes the system information area identifier information and RAN area identifier information.

Figure 9:
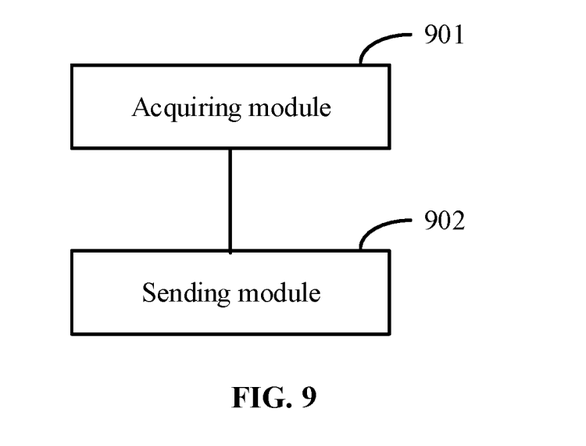
FIG. 9 is a block diagram of a device for transmitting configuration information according to an exemplary embodiment.

FIG. 9 is a block diagram of a device for transmitting configuration information according to an exemplary embodiment, which may be implemented as part or all of an electronic device through software, hardware, or a combination of software and hardware. Referring to FIG. 9, the device for transmitting configuration information includes an acquiring module 901 and a sending module 902.

The acquiring module 901 is configured to acquire area range information from a base station.

The sending module 902 is configured to send the area range information to a scheduled UE in a same group.

Figure 10:
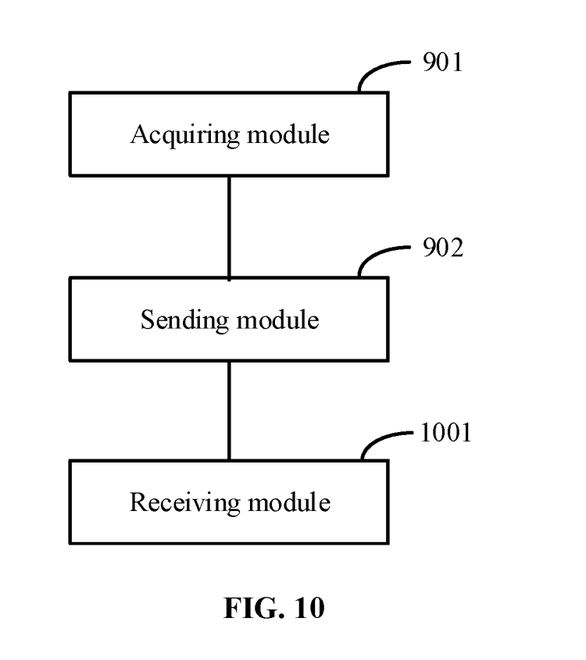
FIG. 10 is a block diagram of a device for transmitting configuration information according to an exemplary embodiment.

In one embodiment, as shown in FIG. 10, the device further includes a receiving module 1001.

The receiving module 1001 is configured to receive relevant information regarding transmission resource pool information of a cell outside the area range from the scheduled UE in the same group.

In one embodiment, the relevant information regarding the transmission resource pool information of the cell outside the area range includes at least one of:

a cell identifier of the cell, available transmission resource pool information of the cell, system information area identifier information corresponding to the cell, RAN area identifier information corresponding to the cell or no network coverage information.

With respect to the device in the embodiments described above, the specific manner in which the various modules perform operations has been described in detail in the embodiments of the method, and will not be described in detail herein.

Figure 11:
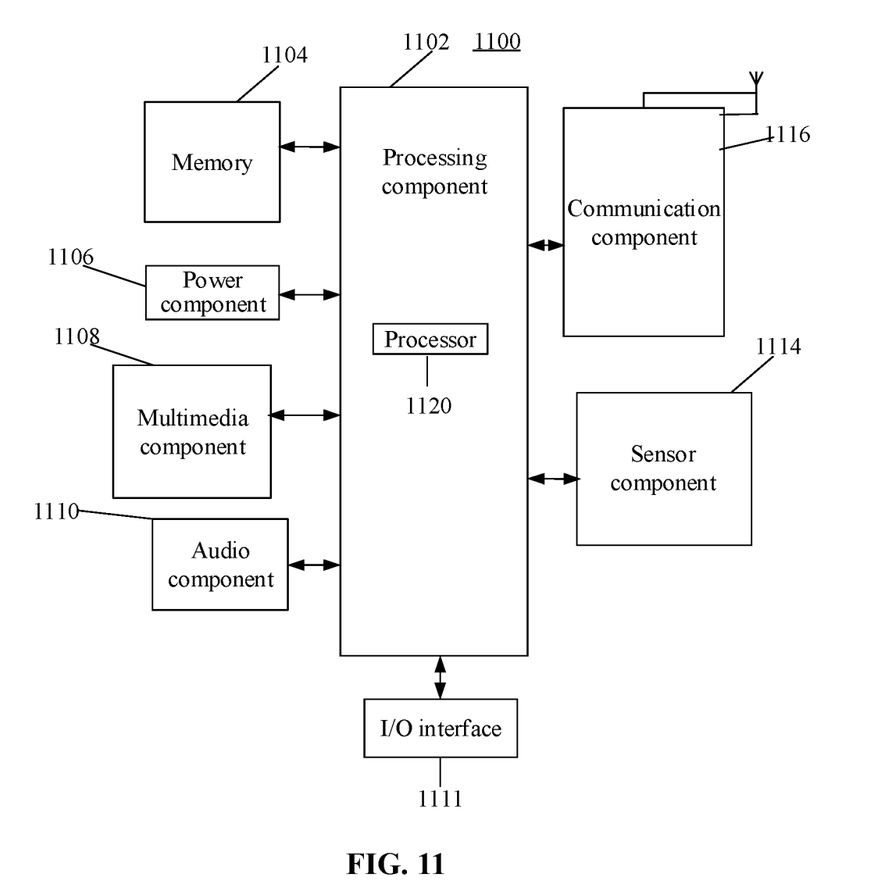
FIG. 11 is a block diagram of a device suitable for transmitting configuration information according to an exemplary embodiment.

FIG. 11 is a block diagram of a device for transmitting configuration information according to an exemplary embodiment. For example, the device 1100 may be a mobile phone, a computer, a digital broadcasting terminal, a messaging equipment, a game console, a tablet equipment, a medical equipment, a fitness equipment, a personal digital assistant and the like.

The device 1100 may include one or more components: a processing component 1102, a memory 1104, a power component 1106, a multimedia component 1108, an audio component 1110, an input/output (I/O) interface 1111, a sensor component 1114, and a communication component 1116.

The processing component 1102 generally controls overall operation of the device 1100, such as operations related to displaying, telephone calls, data communications, camera operations, and recording operations. The processing component 1102 may include one or more processors 1120 which execute instructions, to implement all or a part of the steps of the method described above. In addition, the processing component 1102 may include one or more modules to facilitate interaction between the processing component 1102 and other components. For example, the processing component 1102 may include a multimedia module to facilitate interaction between the multimedia component 1108 and the processing component 1102.

The memory 1104 is configured to store various types of data to support the operation at the device 1100. Examples of such data include instructions for any application program or method operating on the device 1100, contact data, phone book data, messages, pictures, videos, etc. The memory 1104 may be implemented by any type of volatile or non-volatile storage devices or a combination thereof, such as a Static Random Access Memory (SRAM), an Electrically Erasable Programmable Read-Only Memory (EEPROM), an Electrically Programming Read-Only Memory (EPROM), a Programmable Read-Only Memory (PROM), a Read-Only Memory (ROM), a magnetic memory, a flash memory, a magnetic disk or an optical disk.

The power component 1106 provides power for various components of the device 1100. The power component 1106 may include a power management system, one or more power supplies, and other components associated with generating, managing, and distributing power for device 1100.

The multimedia component 1108 includes a screen providing an output interface between the device 1100 and a user. In some embodiments, the screen may include a Liquid Crystal Display (LCD) and a Touch Panel (TP). If the screen includes the TP, the screen may be implemented as a touch screen to receive an input signal from the user. The TP includes one or more touch sensors to sense touch, swipe, and gestures on the TP. The touch sensors may not only sense a boundary of a touch or swipe action, but also detect a time of duration and a pressure associated with the touch or swipe action. In some embodiments, the multimedia component 1108 includes a front camera and/or a rear camera. The front camera and/or the rear camera may receive external multimedia data when the device 1100 is in an operation mode, such as a photographing mode or a video mode. Each of the front camera and rear camera may be a fixed optical lens system or may have a focus and optical zoom capability.

The audio component 1110 is configured to output and/or input audio signals. For example, the audio component 1110 includes a microphone (MIC) configured to receive an external audio signal when the device 1100 is in an operation mode, such as a call mode, a recording mode, and a voice recognition mode. The received audio signals may be further stored in the memory 1104 or transmitted via the communication component 1116. In some embodiments, the audio component 1110 may further include a speaker to output audio signals.

The I/O interface 1111 provides an interface between the processing component 1102 and peripheral interface modules. The peripheral interface modules may be keyboards, click wheels, buttons, etc. These buttons may include, but are not limited to, a home button, a volume button, a starting button, and a locking button.

The sensor component 1114 includes one or more sensors to provide status assessments of various aspects of the communication device 1100. For instance, the sensor component 1114 may detect an open/closed status of the device 1100, relative positioning of components, such as the display and the keypad of the device 1100, and the sensor component 1114 may also detect a change in position of the device 1100 or a component of the device 1100, a presence or absence of user contact with the device 1100, an orientation or an acceleration/deceleration of the communication device 1100, and a change in temperature of the communication device 1100. The sensor component 1114 may include a proximity sensor, configured to detect the presence of nearby objects without any physical contact. The sensor component 1114 may also include a light sensor, such as a Complementary Metal Oxide Semiconductor (CMOS) or Charge Coupled Device (CCD) image sensor, configured for use in an imaging application. In some embodiments, the sensor component 1114 may also include an accelerometer sensor, a gyroscope sensor, a magnetic sensor, a pressure sensor, or a temperature sensor.

The communication component 1116 is configured to facilitate wired or wireless communication between the device 1100 and another device. The device 1100 may access a communication standard-based wireless network, such as a Wireless Fidelity (Wi-Fi) network, a 2nd-Generation (2G) or 3rd-Generation (3G) network or a combination thereof. In an exemplary embodiment, the communication component 1116 receives a broadcast signal or broadcasts related information from an external broadcast management system via a broadcast channel. In one exemplary embodiment, the communication component 1116 further includes a Near Field Communication (NFC) module to facilitate short-range communications. For example, the NFC module may be implemented based on a Radio Frequency Identification (RFID) technology, an Infrared Data Association (IrDA) technology, an Ultra-Wide Band (UWB) technology, a Bluetooth (BT) technology and other technologies.

In the exemplary embodiment, the device 1100 may be implemented by one or more Application-Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, microcontrollers, microprocessors, or other electronic components to implement the above method.

In the exemplary embodiment, a non-transitory computer-readable storage medium including an instruction, such as a memory 1104 including an instruction, is further provided. The instruction may be executed by the processor 1120 of the device 1100 to complete the above method. For example, the non-transitory computer-readable storage medium may be a Read Only Memory (ROM), a Random Access Memory (RAM), a CD-ROM, a magnetic tape, a floppy disc, an optical data storage device, and the like.

In an exemplary embodiment, a device for transmitting configuration information is provided, which includes:
a processor; and a memory for storing instructions executable by the processor.

The processor is configured to:
check whether a scheduled UE has moved out of a preconfigured area range when a cell change is performed; and
send a notification message to a scheduling UE in a same group when the scheduled UE has moved out of the preconfigured area range, and the notification message includes relevant information regarding transmission resource pool information of a changed cell.

The above processor may also be configured to perform the following operation:
before it is checked whether the scheduled UE has moved out of the preconfigured area range, the method further includes the following operations:
area range information from the scheduling UE in the same group is received.

The above processor may also be configured:
the area range information includes one of cell list information, system information area identifier list information and RAN area identifier list information.

The above processor may also be configured:
the area range is a cell before the change.

The above processor may also be configured:
the notification message includes RRC signaling between UEs or MAC signaling between UEs.

The above processor may also be configured:
the relevant information regarding the transmission resource pool information of the changed cell includes at least one of:
a cell identifier of the changed cell, available transmission resource pool information of the changed cell, system information area identifier information corresponding to the changed cell, RAN area identifier information corresponding to the changed cell or no network coverage information after the change.

The above processor may also be configured:
before the notification message is sent to the scheduling UE in the same group, the method further includes:
system information is received from a base station when the base station serves on a frequency used for communication between the UEs, and the system information includes the cell identifier and the available transmission resource pool information of the changed cell.

The above processor may also be configured:
the system information further includes the system information area identifier information and the RAN area identifier information; and
the notification message further includes the system information area identifier information and the RAN area identifier information.

A computer-readable storage medium is provided. Instructions in the storage medium, when executed by a processor of the device, cause the device to execute the method for transmitting configuration information as described above. The method includes the following operations:
it is checked whether a scheduled UE has moved out of a preconfigured area range when a cell change is performed; and
a notification message is sent to a scheduling UE in a same group when the scheduled UE has moved out of the preconfigured area range, and the notification message includes relevant information regarding transmission resource pool information of a changed cell.

The instructions in the storage medium may further include:
before it is checked whether the scheduled UE has moved out of the preconfigured area range, the method further includes the following operations:
area range information sent by the scheduling UE in the same group is received.

The instructions in the storage medium may further include:
the area range information includes one of cell list information, system information area identifier list information and RAN area identifier list information.

The instructions in the storage medium may further include:
the area range is a cell before the change.

The instructions in the storage medium may further include:
the notification message includes RRC signaling between UEs or MAC signaling between UEs.

The instructions in the storage medium may further include:
the relevant information regarding the transmission resource pool information of the changed cell includes at least one of:
a cell identifier of the changed cell, available transmission resource pool information of the changed cell, system information area identifier information corresponding to the changed cell, RAN area identifier information corresponding to the changed cell or no network coverage information after the change.

The instructions in the storage medium may further include:
before the notification message is sent to the scheduling UE in the same group, the method further includes the following operations:
system information sent by a base station is received when the base station serves on a frequency used for communication between the UEs, and the system information includes the cell identifier and the available transmission resource pool information of the changed cell.

The instructions in the storage medium may further include:
the system information further includes the system information area identifier information and the RAN area identifier information; and
the notification message further includes the system information area identifier information and the RAN area identifier information.

In an exemplary embodiment, a device for transmitting configuration information is provided, which includes:
a processor; and
a memory for storing instructions executable by the processor.

The processor is configured to:
acquire area range information from a base station; and
send the area range information to a scheduled UE in a same group.

The above processor may also be configured:
the method further includes the following operation:
relevant information regarding transmission resource pool information of a cell outside the area range is received from the scheduled UE in the same group.

The above processor may also be configured:
the relevant information regarding the transmission resource pool information of the cell outside the area range includes at least one of:

a cell identifier of the cell, available transmission resource pool information of the cell, system information area identifier information corresponding to the cell, RAN area identifier information corresponding to the cell or no network coverage information.

A computer-readable storage medium is provided. Instructions in the storage medium, when executed by a processor of the device, cause the device to execute the method for transmitting configuration information as described above. The method includes the following operations:

area range information is acquired from a base station; and the area range information is sent to a scheduled UE in a same group.

The instructions in the storage medium may further include:

the method further include the following operation:

relevant information regarding transmission resource pool information of a cell outside the area range is received from the scheduled UE in the same group.

The instructions in the storage medium may further include:

the relevant information regarding the transmission resource pool information of the cell outside the area range includes at least one of:

a cell identifier of the cell, available transmission resource pool information of the cell, system information area identifier information corresponding to the cell, RAN area identifier information corresponding to the cell or no network coverage information.

The present disclosure may include dedicated hardware implementations such as application specific integrated circuits, programmable logic arrays and other hardware devices. The hardware implementations can be constructed to implement one or more of the methods described herein. Examples that may include the apparatus and systems of various implementations can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors. The module refers herein may include one or more circuit with or without stored code or instructions. The module or circuit may include one or more components that are connected.

Other implementation solutions of the present disclosure will be apparent to those skilled in the art from consideration of the specification and practice of the present disclosure disclosed here. This disclosure is intended to cover any variations, uses, or adaptations of the disclosure following the general principles thereof and including such departures from the disclosure as come within known or customary practice in the art. It is intended that the specification and examples be considered as exemplary only.

It will be appreciated that the disclosure is not limited to the exact construction that has been described above and illustrated in the accompanying drawings, and that various modifications and changes may be made without departing from the scope thereof.

What is claimed is:

1. A method for transmitting configuration information, performed by a scheduled user equipment (UE) and comprising:

checking whether the scheduled UE has moved out of a preconfigured area range when performing a cell change; and sending a notification message to a scheduling UE in a same group when the scheduled UE has moved out of the preconfigured area range, wherein the scheduled UE and the scheduling UE are communicated through a sidelink, and the notification message comprises relevant information regarding transmission resource pool information of a changed cell;

wherein before sending the notification message to the scheduling UE in the same group, the method further comprises:

when a base station serves on a frequency used for communication between the UEs, receiving system information from the base station, wherein the system information comprises a cell identifier and available transmission resource pool information of the changed cell, system information area identifier information corresponding to the changed cell and radio access network (RAN) area identifier information corresponding to the changed cell, and the notification message further comprises the system information area identifier information and the RAN area identifier information.

2. The method of claim 1, wherein before checking whether the scheduled UE has moved out of the preconfigured area range, the method further comprises:

receiving area range information from the scheduling UE in the same group.

3. The method of claim 2, wherein the area range information comprises one of cell list information, system information area identifier list information and RAN area identifier list information.

4. The method of claim 1, wherein the area range is a cell before the change.

5. The method of claim 1, wherein the notification message comprises radio resource control (RRC) signaling between UEs or medium access control (MAC) signaling between UEs.

6. The method of claim 1, wherein the relevant information regarding the transmission resource pool information of the changed cell comprises at least one of the cell identifier of the changed cell, the available transmission resource pool information of the changed cell, the system information area identifier information corresponding to the changed cell, the RAN area identifier information corresponding to the changed cell or no network coverage information after the change.

7. A device for transmitting configuration information, comprising:

a processor; and a memory for storing instructions executable by the processor;

wherein the processor is configured to execute the instructions stored in the memory to cause the device to:

check whether a scheduled user equipment (UE) has moved out of a preconfigured area range when a cell change is performed; and send a notification message to a scheduling UE in a same group when the scheduled UE has moved out of the preconfigured area range, wherein the scheduled UE and the scheduling UE are communicated through a sidelink, and the notification message comprises relevant information regarding transmission resource pool information of a changed cell;

wherein the processor is configured to execute the instructions to cause the device to:

receive, before sending the notification message to the scheduling UE in the same group, system information sent by a base station when the base station serves on a frequency used for communication between the UEs, wherein the system information comprises a cell identifier and available transmission resource pool information of the changed cell, system information area identifier information corresponding to the changed cell and radio access network (RAN) area identifier information corresponding to the changed cell, and the notification message further comprises the system information area identifier information and the RAN area identifier information.

8. The device of claim 7, wherein the processor is configured to execute the instructions stored in the memory to cause the device to:

receive area range information from the scheduling UE in the same group.

9. The device of claim 8, wherein the area range information comprises one of cell list information, system information area identifier list information and RAN area identifier list information.

10. The device of claim 7, wherein the area range is a cell before the change.

11. The device of claim 7, wherein the notification message comprises radio resource control (RRC) signaling between UEs or medium access control (MAC) signaling between UEs.

12. The device of claim 7, wherein the relevant information regarding the transmission resource pool information of the changed cell comprises at least one of:

the cell identifier of the changed cell, the available transmission resource pool information of the changed cell, the system information area identifier information corresponding to the changed cell, the RAN area identifier information corresponding to the changed cell or no network coverage information after the change.

13. A non-transitory computer-readable storage medium having stored thereon computer instructions that, when executed by a processor of a scheduled user equipment (UE), implement a method for transmitting configuration information, comprising:

checking whether the scheduled UE has moved out of a preconfigured area range when performing a cell change; and sending a notification message to a scheduling UE in a same group when the scheduled UE has moved out of the preconfigured area range, wherein the scheduled UE and the scheduling UE are communicated through a sidelink, and the notification message comprises relevant information regarding transmission resource pool information of a changed cell;

wherein before sending the notification message to the scheduling UE in the same group, the method further comprises:

when a base station serves on a frequency used for communication between the UEs, receiving system information from the base station, wherein the system information comprises a cell identifier and available transmission resource pool information of the changed cell, system information area identifier information corresponding to the changed cell and radio access network (RAN) area identifier information corresponding to the changed cell, and the notification message further comprises the system information area identifier information and the RAN area identifier information.

* * * * *